US008827022B2

(12) United States Patent
Jaberian

(10) Patent No.: US 8,827,022 B2
(45) Date of Patent: Sep. 9, 2014

(54) CHASSIS ASSEMBLY FOR AN ELECTRICAL POWERED VEHICLE

(76) Inventor: Mohammad Sadegh Jaberian, Brooklyn Park, MN (US)

( * ) Notice: Subject to any disclaimer, the term of this patent is extended or adjusted under 35 U.S.C. 154(b) by 357 days.

(21) Appl. No.: 13/249,522

(22) Filed: Sep. 30, 2011

(65) Prior Publication Data

US 2013/0081886 A1    Apr. 4, 2013

(51) Int. Cl.
    B60K 1/04      (2006.01)
    B60L 11/14     (2006.01)
    B62D 21/06     (2006.01)
    B62D 21/11     (2006.01)
    B60K 25/08     (2006.01)
    B60L 11/18     (2006.01)

(52) U.S. Cl.
    CPC ............. B60K 1/04 (2013.01); *B60Y 2200/148* (2013.01); *Y02T 10/705* (2013.01); *Y02T 10/7077* (2013.01); B60L 11/14 (2013.01); B62D 21/06 (2013.01); *Y02T 10/7005* (2013.01); B62D 21/11 (2013.01); B60K 25/08 (2013.01); *B60K 2001/0444* (2013.01); B60L 11/1877 (2013.01)
    USPC ........................................ 180/68.5; 180/65.1

(58) Field of Classification Search
    CPC ............. B60K 1/00; B60K 1/02; B60K 1/04; B60K 6/20; B60K 6/26; B60K 6/38; B60K 6/40; B60K 25/00; B60K 25/08; B60K 2001/04; B60K 2001/0416; B60K 2001/0444; B60L 11/00; B60L 11/14; B60L 11/18; B62D 63/062; B62D 63/064; B60D 1/143; B60D 1/173

USPC .......... 180/65.31, 68.5, 14.2, 14.7; 280/460.1
See application file for complete search history.

(56) References Cited

U.S. PATENT DOCUMENTS 2,159,885 A * 5/1939 Cullin ................................ 322/1
3,049,928 A * 8/1962 Boughner ........................ 74/13
(Continued)

FOREIGN PATENT DOCUMENTS

AU          A 63 835/80         10/1980
EP             0051711 A1        5/1982
(Continued)

OTHER PUBLICATIONS

Nissan Leaf (From Wikipedia, the free encyclopedia) [online]. [retrieved on Jun. 7, 2011]. Retrieved from the internet:<http://en.wikipedia.org/wiki/Nissan_Leaf#Specifications> 4 pages.

(Continued)

*Primary Examiner* — Katy M Ebner
(74) *Attorney, Agent, or Firm* — IPLM Group, P.A.

(57) ABSTRACT

A chassis assembly for an electrical vehicle is provided. The chassis assembly includes a main chassis, at least one main chassis wheel, a secondary chassis and at least one secondary chassis wheel. The at least one main chassis wheel is rotationally coupled to the main chassis about a main chassis rotational axis. A secondary chassis is pivotally coupled to the main chassis. The secondary chassis is configured and arranged to hold batteries that supply energy to an electric motor coupled to the main chassis. The at least one secondary chassis wheel is rotationally coupled to the secondary chassis about a secondary chassis rotational axis. A pivot connection between the main chassis and the secondary chassis has a pivot axis that is generally parallel with the main chassis rotational axis and the secondary chassis rotational axis.

16 Claims, 6 Drawing Sheets

(56) References Cited

U.S. PATENT DOCUMENTS

| | | | | |
|---|---|---|---|---|
| 3,521,722 | A | * | 7/1970 | Dimonte .................. 180/65.1 |
| 3,690,397 | A | * | 9/1972 | Parker et al. ............... 180/65.6 |
| 4,165,466 | A | * | 8/1979 | Stikkers ...................... 290/3 |
| 4,199,037 | A | * | 4/1980 | White .................. 180/65.245 |
| 4,239,253 | A | * | 12/1980 | Golze ..................... 280/460.1 |
| 4,512,593 | A | * | 4/1985 | Ehrhardt ................. 280/460.1 |
| 4,664,403 | A | * | 5/1987 | Livingston .............. 280/460.1 |
| 5,215,156 | A | * | 6/1993 | Stulbach et al. .......... 180/65.31 |
| 5,289,905 | A | | 3/1994 | Braschler |
| 5,520,404 | A | * | 5/1996 | Schulte .................. 280/460.1 |
| 5,559,420 | A | * | 9/1996 | Kohchi ..................... 180/68.5 |
| 5,767,663 | A | * | 6/1998 | Lu ............................... 322/12 |
| 5,921,334 | A | * | 7/1999 | Al-Dokhi ..................... 180/2.2 |
| 5,934,397 | A | * | 8/1999 | Schaper .................. 180/65.245 |
| 6,390,215 | B1 | * | 5/2002 | Kodama et al. .......... 180/65.22 |
| 6,994,560 | B2 | * | 2/2006 | Kohchi ......................... 439/43 |
| 7,475,747 | B2 | * | 1/2009 | Plishner ................... 180/65.31 |
| 7,514,803 | B2 | * | 4/2009 | Wilks ........................... 290/1 A |
| 7,547,980 | B2 | * | 6/2009 | Harrison ...................... 290/1 R |
| 7,687,959 | B1 | | 3/2010 | Lee |
| 7,905,507 | B2 | * | 3/2011 | Perri ....................... 280/455.1 |
| 7,913,783 | B2 | * | 3/2011 | Elmaleh ................... 180/65.31 |
| 8,220,568 | B2 | * | 7/2012 | Stoicoviciu ................ 180/2.1 |
| 8,347,999 | B2 | * | 1/2013 | Koelsch et al. ............... 180/165 |
| 8,464,816 | B2 | * | 6/2013 | Carrier ....................... 180/24.07 |
| 8,643,201 | B2 | * | 2/2014 | Scott ............................ 290/1 R |
| 2001/0008191 | A1 | | 7/2001 | Smith et al. |
| 2001/0022245 | A1 | | 9/2001 | Rogg |
| 2004/0012205 | A1 | * | 1/2004 | Sua-An ....................... 290/40 C |
| 2006/0152180 | A1 | | 7/2006 | Tahara et al. |
| 2007/0261902 | A1 | * | 11/2007 | Margoudakis ............... 180/65.3 |
| 2008/0308335 | A1 | | 12/2008 | Anderson et al. |
| 2010/0006351 | A1 | | 1/2010 | Howard |
| 2010/0025131 | A1 | | 2/2010 | Gloceri et al. |
| 2010/0051364 | A1 | * | 3/2010 | Arad ........................ 180/65.31 |
| 2010/0065348 | A1 | * | 3/2010 | Arad ............................ 180/11 |
| 2010/0241298 | A1 | * | 9/2010 | Sinke et al. ..................... 701/22 |
| 2011/0031051 | A1 | * | 2/2011 | George ..................... 180/65.31 |
| 2011/0240385 | A1 | * | 10/2011 | Farmer ...................... 180/65.27 |
| 2012/0152634 | A1 | * | 6/2012 | Skis .............................. 180/165 |
| 2012/0255279 | A1 | * | 10/2012 | Atluri et al. ..................... 60/274 |
| 2012/0273285 | A1 | * | 11/2012 | Jensen et al. ................ 180/65.1 |

FOREIGN PATENT DOCUMENTS

| | | |
|---|---|---|
| JP | 2001-313857 | 12/1989 |
| JP | 2007-315060 | 12/1995 |
| JP | 2008-044588 | 2/2008 |
| WO | WO 2009/086135 A2 | 7/2009 |

OTHER PUBLICATIONS

PC18 PMA (Permanent Magnet Alternators PMA Permanent wind turbine mills Magnet Alternators) [online]. [retrieved on Jul. 7, 2011] Retrieved from the internet: <http://liveweb.archive.org/http://vi.ebaydesc.com/ws/eBayISAPI.dll?ViewItemDescV4&item=300552182478&> 1 page.

* cited by examiner

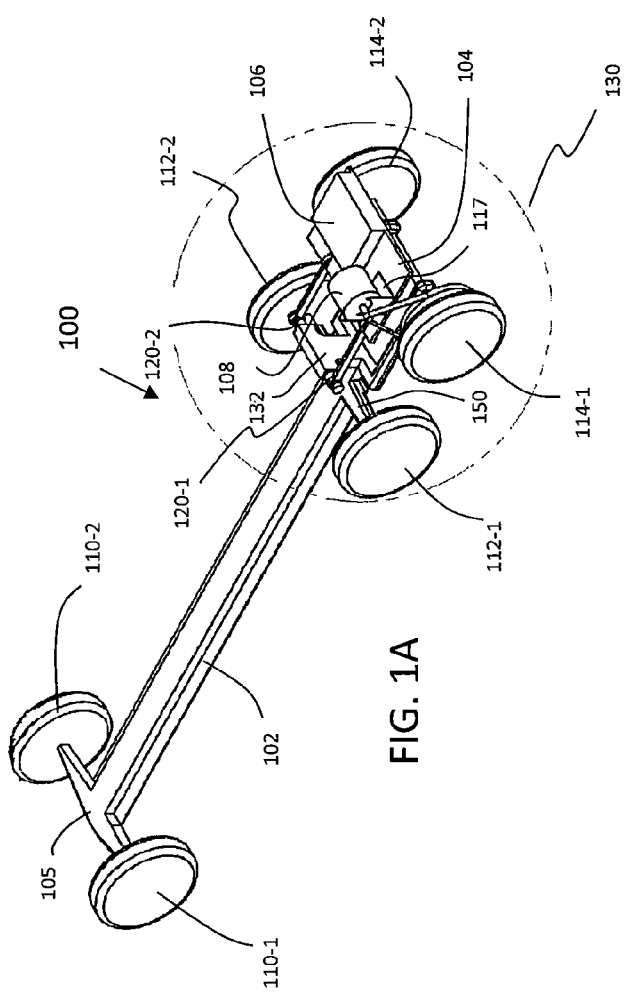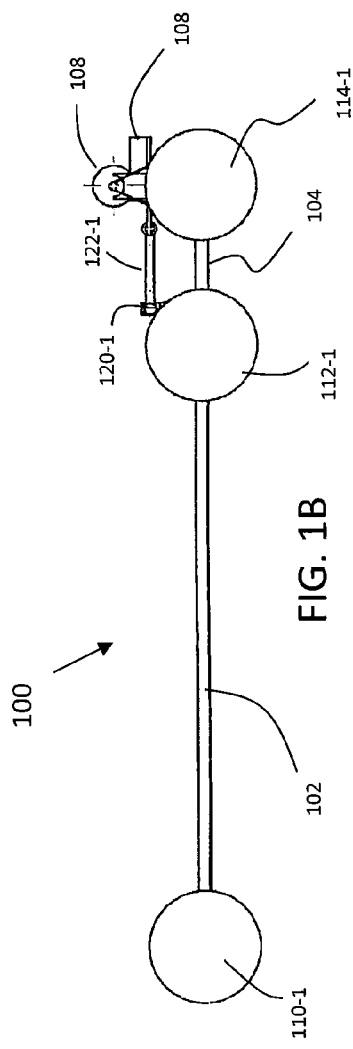

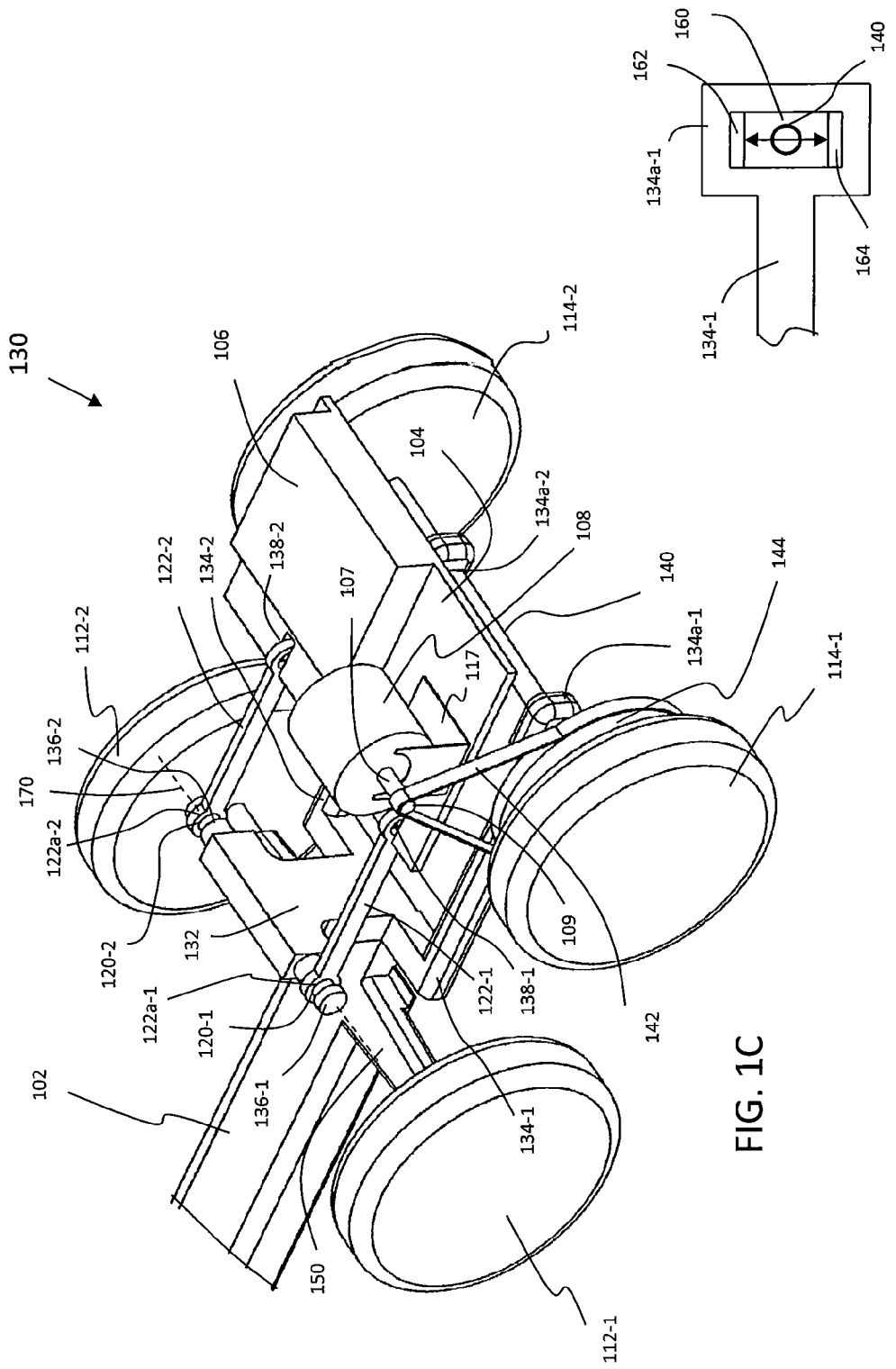

CHASSIS ASSEMBLY FOR AN ELECTRICAL POWERED VEHICLE

BACKGROUND

In order to get away from vehicles that burn fossil fuels to generate motion, vehicles with electric motors are becoming more and more popular. A major downside of electric power vehicles are their inefficiency. The efficiency of electric vehicles is limited by, among other things, the weight of batteries needed to power their electric motor. The weight of the batteries adds additional downward forces, due to gravity, on the wheels of the vehicles. The downward force increases the rolling resistance encountered by the wheels thereby increasing the energy needed to move the wheels.

For the reasons stated above and for other reasons stated below which will become apparent to those skilled in the art upon reading and understanding the present specification, there is a need in the art for an efficient and effective design to enhance the efficiency of an electric motor vehicle.

SUMMARY OF INVENTION

The above-mentioned problems of current systems are addressed by embodiments of the present invention and will be understood by reading and studying the following specification. The following summary is made by way of example and not by way of limitation. It is merely provided to aid the reader in understanding some of the aspects of the invention.

In one embodiment, a chassis assembly for an electrical vehicle is provided. The chassis assembly includes a main chassis, at least one main chassis wheel, a secondary chassis and at least one secondary chassis wheel. The at least one main chassis wheel is rotationally coupled to the main chassis about a main chassis rotational axis. A secondary chassis is pivotally coupled to the main chassis. The secondary chassis is configured and arranged to hold batteries that supply energy to an electric motor coupled to the main chassis. The at least one secondary chassis wheel is rotationally coupled to the secondary chassis about a secondary chassis rotational axis. A pivot connection between the main chassis and the secondary chassis has a pivot axis that is generally parallel with the main chassis rotational axis and the secondary chassis rotational axis.

In yet another embodiment, a vehicle is provided. The vehicle includes a main chassis, at least one main chassis wheel, an electric motor, a secondary chassis, at least one secondary wheel, at least one battery and at least one power generating system. The at least one main chassis wheel is rotationally coupled to the main chassis. The electric motor is configured and arranged to rotate the at least one main chassis wheel and is coupled to the main chassis. The secondary chassis is coupled to the main chassis via at least one pivot connection having a pivot axis. The at least one secondary chassis wheel is rotationally coupled to secondary chassis. The secondary chassis has a rotational axis that is generally parallel with the pivot axis. The at least one battery is coupled to the secondary chassis and is further coupled to provide energy to operate the electric motor. The at least one power generating system is configured and arranged to provide energy to charge the battery and to drive the electric motor.

In still another embodiment, a vehicle is provided. The vehicle including, a main chassis, at least two main chassis wheels, an electric motor, a secondary chassis, at least one battery, at least one secondary chassis wheel, a power generating system and a controller. The main chassis has a front end and a rear end. The at least two main chassis wheels are rotationally coupled to the main chassis. The electric motor is coupled to the main chassis to provide, at least in part, power to rotate at least one of the at least two main chassis wheels. The secondary chassis is pivotally coupled proximate the rear end of the main chassis via at least first and second spaced pivot points. The at least one battery is coupled to the secondary chassis. The at least one battery is further coupled to provide energy to operate the electric motor. The at least one secondary chassis wheel is rotationally coupled to the secondary chassis. The power generating system is coupled to the secondary chassis. The power generating system is further coupled to generate energy via the rotation of the at least one secondary chassis wheel. The controller is coupled to direct the energy generated by the power generation system to selectively to charge the at least one battery and to selectively power the electric motor.

BRIEF DESCRIPTION OF THE DRAWINGS

The present invention can be more easily understood and further advantages and uses thereof will be more readily apparent, when considered in view of the detailed description and the following figures in which:

FIG. 1A is a side isometric view of a chassis assembly of one embodiment of the present invention;

FIG. 1B is a side view of the chassis assembly of FIG. 1A;

FIG. 1C is a close-up side isometeric view of a portion of the chassis assembly of FIG. 1A;

FIG. 1D is a side view of an engaging end of a first dampening arm of one embodiment of the present invention;

In accordance with common practice, the various described features are not drawn to scale but are drawn to emphasize specific features relevant to the present invention. Reference characters denote like elements throughout Figures and text.

DETAILED DESCRIPTION

Figure 2A:
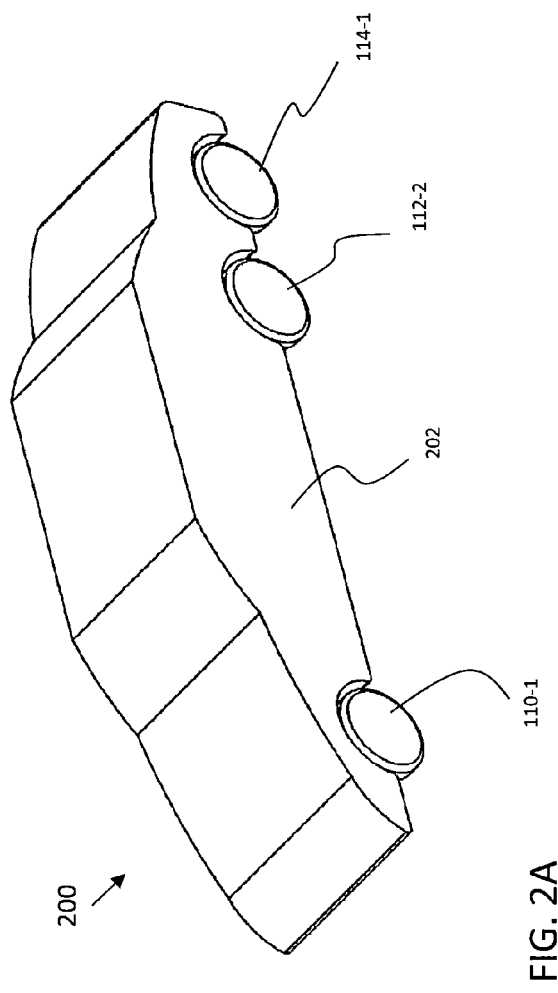
FIG. 2A is a side isometric view of a vehicle of one embodiment of the present invention.

In the following detailed description, reference is made to the accompanying drawings, which form a part hereof, and in which is shown by way of illustration specific embodiments in which the inventions may be practiced. These embodiments are described in sufficient detail to enable those skilled in the art to practice the invention, and it is to be understood that other embodiments may be utilized and that changes may be made without departing from the spirit and scope of the present invention. The following detailed description is, therefore, not to be taken in a limiting sense, and the scope of the present invention is defined only by the claims and equivalents thereof.

Embodiments of the present invention provide vehicles that include an electric motor. The vehicles include a chassis assembly that enhances the efficiency of the vehicle by putting most of the vertical gravitational force caused by the weight of batteries that power the electronic motor on at least one additional wheel that is rotationally coupled to a secondary chassis. Moreover, in one embodiment, a power generating system generating energy by the rotation of a wheel is designed to provide power to the electric motor. Referring to FIG. 1A is side isometric view of a chassis assembly 100 of one embodiment is illustrated. Chassis assembly 100 includes a main chassis 102 and a secondary chassis 104. The secondary chassis 104 can also be referred to as the battery chassis or trailer. The secondary chassis 104 is coupled to the main chassis via pivot connections 120-1 and 120-2. An axis of rotation 170 of the pivot connection is further illustrated in FIG. 1C. The axis of rotation 170 is generally parallel with the rotation of axis of each of the wheels 110-1, 110-2, 112-1, 112-2, 114-1 and 114-2 of the vehicle 100. With this design, batteries 106 held on the secondary chassis 104 do not transfer most vertical force components of weight on the main wheels 110-1, 110-2, 112-1 and 112-2 of the main chassis 102. In FIG. 1A, the main chassis 102 is illustrated as having a front axle 105 that is coupled to the front wheel set 110-1 and 110-2 and a rear axle 150 that is coupled to the rear wheel set 112-1 and 112-2. Although the main chassis 102 is illustrated as including axels 105 and 150, any type of a wheel attachment assembly known in the art can be used and the arrangement shown in FIG. 1A is only provided as an example. The features are further illustrated in the side view of FIG. 1B. Moreover, a close up view 130 of the secondary chassis 104 is illustrated in FIG. 1C.

As illustrated in FIG. 1C, a rear portion of the main chassis 102 includes a connection base 132 that is positioned proximate the rear wheels 112-1 and 112-2. The connection base 132 includes an upper portion with opposed extending first and second rods 136-1 and 136-2. First and second connection members 122-1 and 122-2 are used to couple the secondary chassis 104 to the main chassis 102. In particular, the first connecting member 122-1 includes a first end with a first aperture 122a-1 that receives the first extending rod 136-1 to create a first forward pivot connection 120-1. Likewise, the second connection member 122-2 also includes a first end with a first aperture 122a-2 that receives the second extending rod 136-2 to create a second forward pivot connection 120-2. Each of the first and second extending rods 136-1 and 136-2 includes a head portion to retain the first and second connecting members 122-1 in 122-2 to the connection base 132. Second ends of the first and second connecting members 122-1 and 122-2 are pivotally connected to the secondary chassis 104 at respective spaced rearward pivot connection points 138-1 and 138-2. Generally, horizontal movement of the main chassis 102 forward or backward is transferred to the secondary chassis 104 via connection members 122-1 and 122-2. Vertical forces, however, are generally not transferred between the secondary chassis 104 and the main chassis 102 because of the pivot connections 120-1, 120-2, 138-1 and 138-2. Hence, a vertical force component due to the weight of the batteries on the secondary chassis 104, is generally not transferred to the main chassis 102. Therefore, an electric motor coupled to move at least one of the wheels 110-1, 110-2, 112-1, and 112-2 of the main chassis 102 to move the vehicle does not have to counter the rolling resistance with the full vertical force created by the batteries 106. With the pivot connections between the chassis 102 and 104, generally only the roll resistance force on the supplementary wheels 114-1 and 114-2 in a horizontal direction is encountered by the main wheels 110-1, 110-2, 112-1 and 112-2. Since, the horizontal forces are easier to overcome, there is less power required by the electric motor to move the vehicle in this configuration which result in a more efficient configuration.

Also illustrated in FIG. 1C is a power generating system 108 that is coupled to the secondary chassis 104 via charging bracket 117. The power generating system 108 includes a rotating shaft 107 and a first pulley 109 of the select size. Second chassis 104 further includes a secondary axle 140 in which supplemental wheels 114-1 and 114-2 are coupled. A second pulley 144 of a select size is coupled to rotate with supplemental wheel 114-1. An endless loop member 142, such as a belt, transfers rotation of the second pulley 144 to the first pulley 109. Rotation of the rotating shaft 107 generates current that is used to power the electrical engine and charge the batteries 106. The size of the pulleys 109 and 144 are selected to achieve a desired pulley ratio. Accordingly, a desired level of energy output by the power generating system 107 can be achieved by selecting an appropriate pulley ratio. In particular, the pulley ratio sets a rotational speed of the rotating shaft 107 of the power generating system 108 so that a desired energy output from the power generating system 108 can be achieved. The ratio gives a selected power generating system 108 a desired RPM in order to achieve the power generating systems 108 maximum energy output. In one example embodiment, the ratio of the pulleys 109 and 144 is 30:1. In another example embodiment, the ratio is 20:1. The batteries 106 (or battery 106) are in turn used to power in part an electric motor that turns at least one of the wheels 110-1, 110-2, 112-1, and 112-2 of the main chassis 102. It will be understood in the art that other types of rotational conveying means such as, but not limited to, chains and sprockets can be used and that the present application is not limited to belts and pulleys.

The connection base 132 of this embodiment further includes first and second dampening arms 134-1 in 134-2. The dampening arms 134-1 and 134-2 extend from a lower portion of the connection base 132 to proximate the supplemental axle 140 of the secondary chassis 104 in an opposed fashion. In this embodiment, ends 134a-1 and 134a-2 of the respective first and second dampening arms 134-1 and 134-2 are used to prevent the secondary chassis 104 from hopping uncontrollably while traveling down a road that has bumps and holes. A close up view of end 134a-1 of the first dampening arms 134-1 is shown in FIG. 1D. As illustrated, end 134a-1 of the first dampening arm 134-1 includes a receiving slot 160 in which axle 140 of the secondary chassis 104 moves within. In the embodiment of FIG. 1D, the slot 160 is enclosed by the end 134a-1 of the first dampening arm 134-1 to prevent the axle 140 from being dislodged from the slot 160. If the secondary chassis 104 hits a bump, axle 140 moves up in the receiving slot 160 of dampening arm 134-1 until it hits dampening material 162. This embodiment also includes dampening material 164 position on a bottom portion of the end 134a-1 that dampens the engagement of the axel 140 on the bottom portion if the axel 140 travels downward in the slot 160. A similar arrangement is found in regards to end 134-2 of the second dampening arm 134-2. As stated, this arrangement prevents the secondary chassis 104 from hopping uncontrollably on bumpy roads.

Figure 2B:
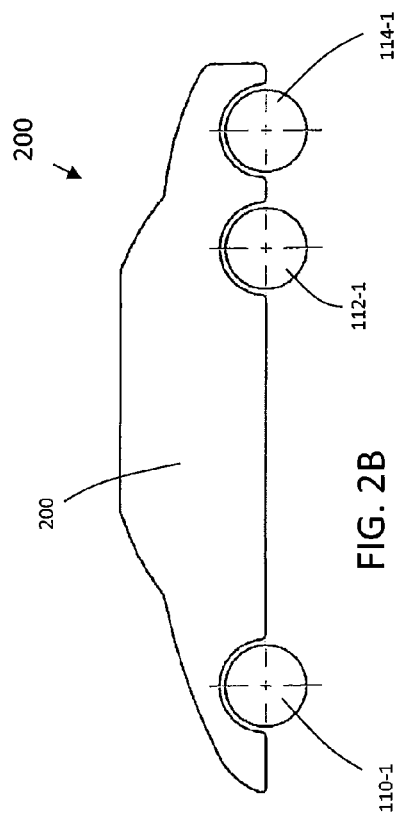
FIG. 2B is a side view of the vehicle of FIG. 2A.

Another force, a motor, such as an electric motor, has to counter in moving a vehicle, is wind resistance created by air engaging the vehicle as the vehicle is moving. An example of a vehicle 200 of an embodiment that addresses this issue is illustrated in FIGS. 2A and 2B. In this embodiment, the vehicle body 202 extends to cover the supplemental chassis 104. By doing this, the wind resistance to the secondary chassis 104 is greatly reduced therein providing a more efficient vehicle 200. Moreover, from an aesthetic point of view, the vehicle's appearance is very similar to current vehicle configurations.

Figure 3:
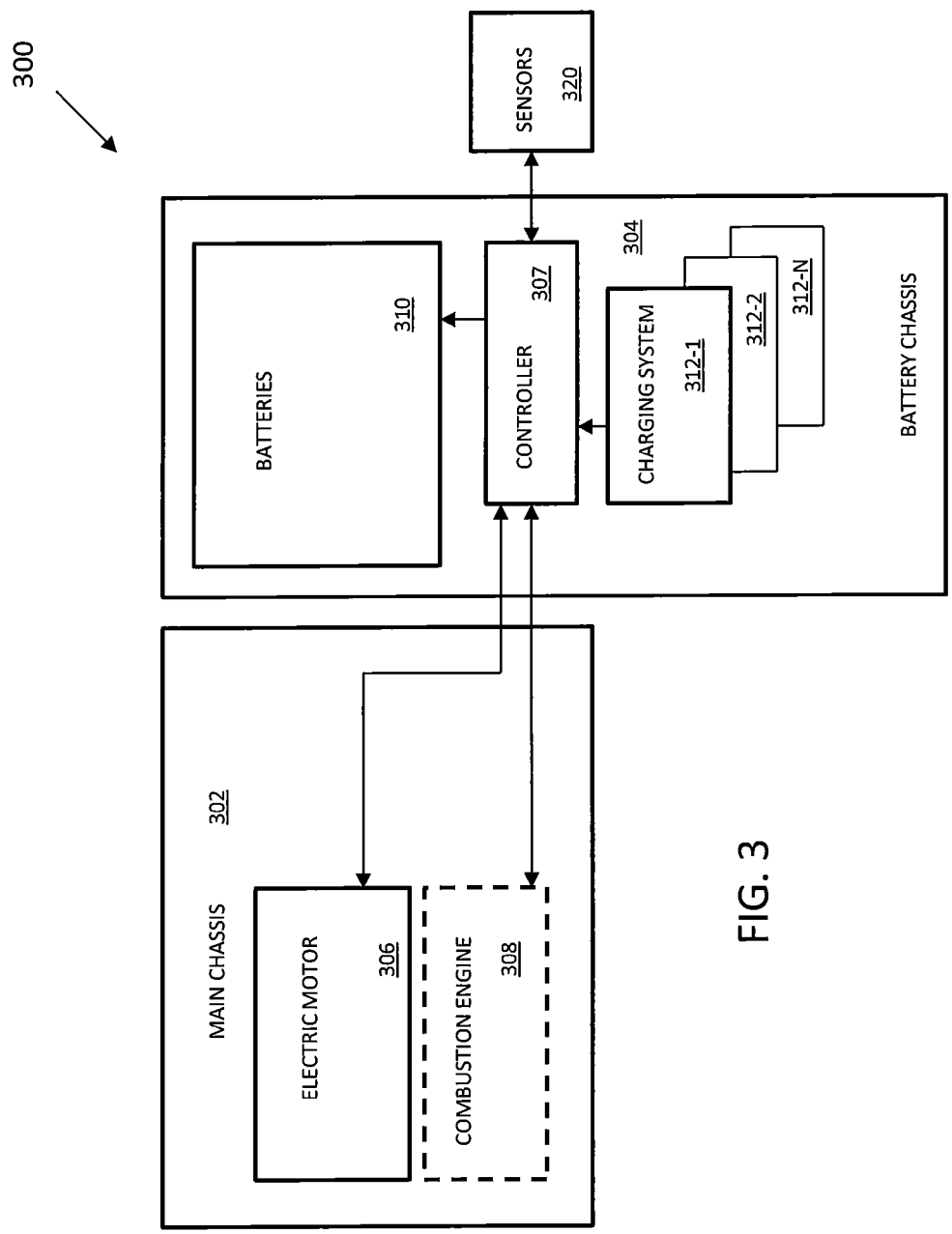
FIG. 3 is a block diagram of a chassis assembly of one embodiment of the present invention.

FIG. 3 illustrates a block diagram of a chassis assembly 300 of an embodiment. The chassis assembly 300 includes a main chassis 302 and a battery chassis 304. The battery chassis 304 may be generally referred to as the secondary chassis 304 or trailer 304. As described in the embodiments above, the secondary chassis 304 is pivotally connected to the main chassis 302 so that vertical forces due to the weight of the battery 310 on the secondary chassis 304 are not conveyed to the main chassis 302. As illustrated, the battery chassis 304 includes the batteries 310 (or battery), power generating systems 312-1, 312-2 and 312-N and a controller 307. Hence, more than one power generating system 312-1, 312-2 and 312-N can be used. In this embodiment, more than one wheel would have an associated power generating system. The power generating systems 312-2, 312-2 and 312-N can generally be designated as a power generating system 312. Power generating system 312 can be any type of energy producing system such as, but not limited to, charging systems, alternators, generators, and the like, that convert rotation movement into energy such as current to charge the batteries 310 and run the electric motor 302. The main chassis 302 includes the electric motor 306 which drives the vehicle. The electric motor 306 is coupled to receive energy to move the vehicle's wheels from the batteries 310 and the power generating system 312 as controlled by the controller 307. For example, the controller 307 is coupled to monitor the energy needed by the electric motor 306 to provide a desired output for the then current situation. The controller 307 then couples the needed energy level via either the batteries 310 and/or charging (power) system 312 so the electric motor can provide the desired output. For example, at startup with the vehicle at rest, the controller 307 will couple energy from the batteries 310 to the electric motor 306 to get the vehicle moving. Once, the wheels are moving, the controller 307 can then couple at least some of the energy from the power generating system 312 to power the electric motor 306 to keep the vehicle moving. Moreover, some of the energy generated by the power generating system 312 can be used by the controller 307 to charge the batteries 310. For example, the charging of the batteries 310 from the power generating system 312 can mainly occur when the vehicle is being slowed down or going down a hill, etc. During those times, the energy created by the power generating system 312 is not needed by the electric motor 306. The controller 307 is coupled to sensors 320 to determine, at least in part, its operations. The sensors 320 can include, but are not limited to: speed sensing sensors, acceleration sensors, vehicle positioning sensors, gas and brake pedal sensors, current meters, voltage meters, resistance meters and the like. The system can also be used with high-bred type vehicles such as vehicles that also include a combustion engine 308, or other type of engine, as illustrated in FIG. 3. In this system, the controller 307 determines when either the electric motor 306 or the engine 308 is to power movement of the vehicle. The controller 307 may include solid state circuits, integrated logic circuits and/or integrated circuits including memory that are configured to execute stored instructions in the memory as known in the art. The secondary chassis 104 can be used not only to carry the batteries 106 and power generating system 108 but any other vehicle equipment 315 to help reduce the vertical forces as the result of weight on the main wheels 110-1, 110-2, 112-1, and 112-2. For example, the secondary chassis could carry a spare tire for the vehicle and other parts associated with the vehicle as well as other items being transported by the vehicle.

Figures 4A, 4B:
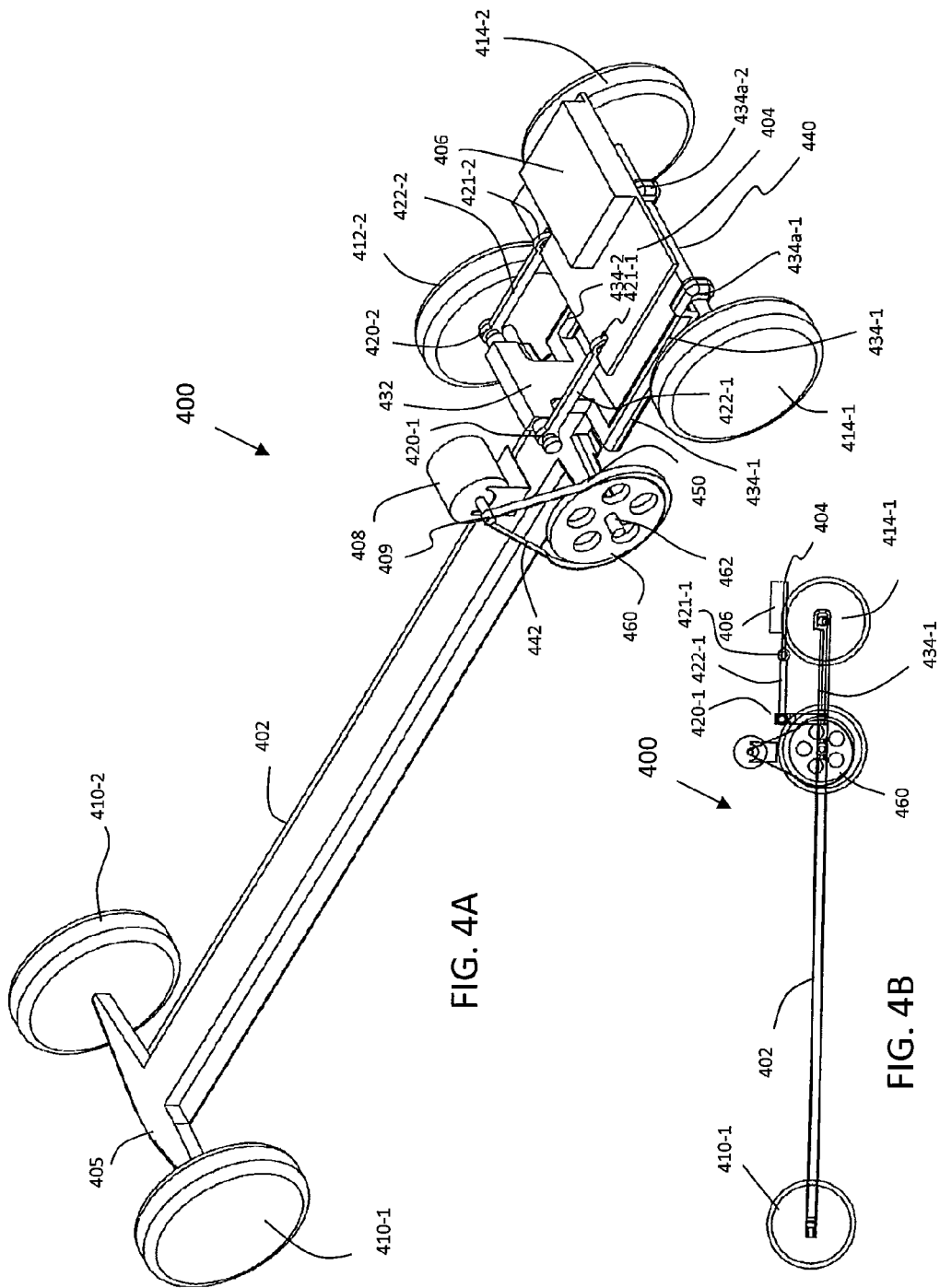
FIG. 4A is a side isometric view of another chassis assembly of another embodiment of the present invention.
FIG. 4B is a side view of the chassis assembly of FIG. 4A.

Another embodiment of a chassis assembly 400 is illustrated in FIGS. 4A and 4B. In this embodiment, the main chassis 402 includes a forward axle 405 upon which front wheels 410-1 and 410-2 are rotationally coupled and a rear axle 450 upon which rear wheels (that include wheel 412-2) are rotationally coupled. The first rear wheel is not shown in FIGS. 4A and 4B to illustrate a first pulley 460 that is in rotational communication with a rotating connection rod 462 that is in turn rotationally coupled to axle 450. In this embodiment the power generating system 408 is coupled to the main chassis 402. A second pulley 409 coupled to the power generating system 408 engages a belt 442 so that rotation of the first pulley 460 is conveyed to the second pulley 409 of the power generating system 408. Current generated by the power generating system 408 would be distributed by a controller to the battery 406 on the secondary chassis 404 and an electrical motor operating the vehicle. Similar to the chassis device discussed above, chassis assembly 400 includes a connection base 432 that is coupled to a rear portion of the main chassis 402. Connection members 422-1 and 422-2 pivotally connect the secondary chassis 404 to the main chassis 402. In particular, connection member 422-1 has a first end that is coupled to an upper portion of the connection base 432 at connection pivot point 420-1 and the second end that is connected to the secondary chassis 404 at connection pivot point 421-1. Connection member 422-2 has a first end that is coupled to an opposed upper portion of the connection base 432 at connection pivot point 420-2 and the second end that is connected to the secondary chassis 404 at connection pivot point 421-2. This embodiment of the connection base 432 also includes first and second dampening arms 434-1 and 434-2 having respective dampening ends 434a-1 and 434b-2 that are designed to engage a secondary axle 440 of the secondary chassis 44 to prevent the secondary chassis 404 from hopping due to bumps in the road. Also illustrated in FIGS. 4A and 4B are supplemental wheels 414-1 and 414-2 that are attached to the secondary axle 440. Hence in this embodiment the power generating system 408 is positioned on a different chassis than the battery 406.

Figure 5A:
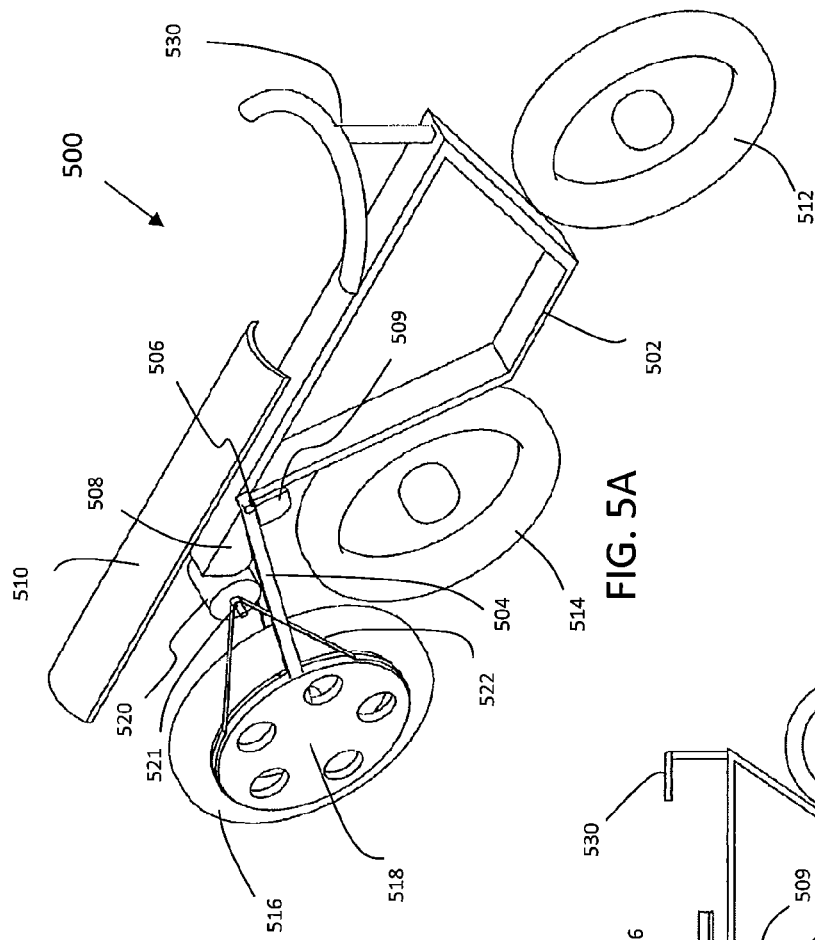
FIG. 5A is a side isometric view of a chassis assembly of yet another embodiment of the present invention.
Figure 5B:
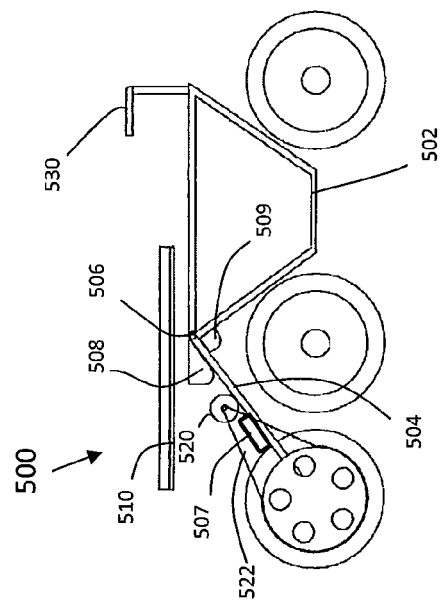
FIG. 5B is a side view of the chassis assembly of FIG. 5A.

Still another embodiment is illustrated in FIGS. 5A and 5B. In particular, FIGS. 5A and 5B illustrate a motorcycle chassis assembly 500. The motorcycle chassis assembly 500 includes a main chassis 502 in which front and rear wheels 512 and 514 would be attached. Also attached to the main chassis 502 is a steering wheel 530 and a seat 510. A secondary chassis 504 is pivotally coupled to the main chassis 502 at pivot connection 506. As with the prior embodiments discussed above, the pivot axis at pivot connection 506 is generally parallel to a rotation axis of the wheels 516, 514 and 512 of the vehicle 500. Attached to the secondary chassis 504 are batteries 507, the power generating system 520 (powering system) and a supplemental wheel 516. A first pulley 518 is in rotational communication to the wheel 516. A belt 522 extends between the first pulley 518 and a second pulley 521 that is coupled to a rotational shaft of the power generator 520. When the supplemental wheel 516 rotates, belt 522 causes the rotational shaft of the power generator 520 to rotate, thereby creating current that is coupled to charge the batteries 508 and provide power to an electric motor that runs the vehicle 500. A controller, such as controller 307, as discussed above, distributes the output of the power generating system 520 as needed. As in the other embodiments, discussed above, the vertical force components generated by the weight of the batteries is mainly born by the supplemental wheel 516 and is not transferred to the other wheels 512 and 514 coupled to the main body 502 of the motorcycle chassis 500 due to the pivot axis of the pivot connection 506. This arrangement provides a more efficient electrical vehicle. Also illustrated in FIGS. 5A and 5B are first and second dampening members 508 and 509 that are positioned to prevent the secondary chassis 504 from hopping uncontrollably due to bumps and holes in the road.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

The invention claimed is:

1. A chassis assembly for an electrical vehicle comprising:
a main chassis, the main chassis having a front end and a rear end;
at least one main chassis wheel rotationally coupled to the main chassis about a main chassis rotational axis;
a secondary chassis pivotally coupled to the main chassis, the secondary chassis configured and arranged to hold batteries that supply energy to an electric motor coupled to the main chassis;
at least one secondary chassis wheel rotationally coupled to the secondary chassis about a secondary chassis rotational axis;
the pivot connection between the main chassis and the secondary chassis having a pivot axis that is generally parallel with the main chassis rotational axis and the secondary chassis rotational axis;
a connection base coupled to the rear end of the main chassis, the connection base further including an upper portion with opposed extending rods;
at least one elongated connection member configured and arranged to pivotally couple the connection base of the main chassis to the secondary chassis; and
the at least one elongated connection member further including a pair of elongated connection members, each elongated connection member having a first end and a second end, the first end of each elongated connection member including an aperture, an associated extending rod of the upper portion of the connection base being received in an associated aperture in the first end of an associated elongated member.

2. The chassis assembly of claim 1, further comprising:
at least one power generating system in rotational communication with at least one of the at least one main wheel chassis wheel and the at least one secondary wheel chassis wheel, the power generating system configured and arranged to selectively provide energy to charge the batteries and to run the electric motor.

3. The chassis assembly of claim 2, further comprising:
a first pulley in rotational communication with the at least one of the at least one main chassis wheel and the at least one secondary chassis wheel;
a second pulley in rotational communication with the power generating system, the size of the first and second pulleys selected to achieve a desired pulley ratio; and
an endless loop member engaged with the first pulley and the second pulley to transfer rotation of the first pulley to the second pulley.

4. The chassis assembly of claim 1, further comprising:
the second end of each elongated connection member further being pivotally coupled to the secondary chassis.

5. The chassis assembly of claim 1, further comprising:
at least one dampening arm extending from the connection base configured and arranged to prevent the second chassis from hopping on a surface the secondary chassis is traveling across.

6. The chassis assembly of claim 5, further comprising:
the at least one dampening arm including an engaging end with a receiving slot; and
an axle coupled to the secondary chassis, a portion of the axle received in the receiving slot in the engaging end of the at least one dampening arm.

7. The chassis assembly of claim 1, wherein the secondary chassis is configured and arranged to be housed in a body that houses the main chassis.

8. A vehicle comprising:
a main chassis;
at least one main chassis wheel rotationally coupled to the main chassis;
an electric motor configured and arranged to rotate the at least one main chassis wheel, the electric motor coupled to the main chassis;
a secondary chassis coupled to the main chassis via at least one pivot connection having a pivot axis;
at least one secondary chassis wheel rotationally coupled to the secondary chassis, the secondary chassis having a rotational axis that is generally parallel with the pivot axis;
at least one battery coupled to the secondary chassis, the at least one battery coupled to provide energy to operate the electric motor; and
at least one power generating system configured and arranged to provide energy to charge the battery and to drive the electric motor; and
at least one dampening arm extending from the main chassis, the at least one dampening arm configured and arranged to selectively engage a portion of the secondary chassis to prevent hopping, wherein the at least one dampening arm includes an engaging end with a receiving slot, the portion of the secondary chassis received in the receiving slot of the dampening arm.

9. The vehicle of claim 8, further comprising:
at least one sensor; and
a controller configured to selectively couple energy to charge the battery and drive the electric motor based at least in part on an output of the at least one sensor.

10. The vehicle of claim 9, wherein the power generating system is coupled to the secondary chassis and is configured and arranged to receive rotational movement as a result of the rotation of the at least one secondary chassis wheel.

11. The vehicle of claim 10, further comprising:
a bracket coupled to the secondary chassis, the at least one power generating system coupled to the bracket;
a first pulley coupled to the power generating system;
a second pulley coupled to rotate in response to the rotation of the at least one secondary chassis wheel, the size of the first and second pulley selected to achieve a desired pulley ratio; and
an endless looped member engaged with the first pulley and the second pulley to convey rotation of the at least one secondary chassis wheel to the power generating system.

12. The vehicle of claim 8, further comprising;
at least one connection member having a first end and a second end, the first end pivotally coupled to the main chassis, the second end pivotally coupled to the secondary chassis.

13. The vehicle of claim 8, further comprising:
a body coupled to the main chassis, the body further configured to cover at least in part the secondary chassis.

14. A vehicle comprising:
a main chassis having a front end and a rear end;
at least two main chassis wheels rotationally coupled to the main chassis;

an electric motor coupled to the main chassis to provide at least in part power to rotate at least one of the at least two main chassis wheels;

a secondary chassis pivotally coupled proximate the rear end of the main chassis via at least first and second spaced pivot points;

at least one battery coupled to the secondary chassis, the at least one battery coupled to provide energy to operate the electric motor;

at least one secondary chassis wheel rotationally coupled to the secondary chassis; and a power generating system coupled to the secondary chassis, the power generating system further coupled to generate energy via the rotation of the at least one secondary chassis wheel;

a controller coupled to direct the energy generated by the power generation system selectively to charge the at least one battery and to selectively power the electric motor; and at least one dampening arm extending from the main chassis, the at least one dampening arm configured and arranged to selectively engage a portion of the secondary chassis to prevent hoping wherein the at least one dampening arm includes an engaging end with a receiving slot, the portion of the secondary chassis received in the receiving slot of the dampening arm.

15. The vehicle of claim 14, further comprising:

a first connection member having a first end pivotally coupled proximate the rear end of the main chassis to form the first pivot point, the first connection member having a second end pivotally coupled to the secondary chassis; and a second connection member spaced from the first connection member, the second connection member having a first end pivotally coupled proximate the rear end of the main chassis to form the second pivot point, the second connection member having a second end pivotally coupled to the secondary chassis.

16. The vehicle of claim 14, further comprising:

a body coupled to the main chassis, the body configured and arranged to house at least a portion of the secondary chassis.

* * * * *